United States Patent [19]

Inaba et al.

[11] Patent Number: 4,502,830
[45] Date of Patent: Mar. 5, 1985

[54] INDUSTRIAL ROBOT

[75] Inventors: Hajimu Inaba; Seiichiro Nakashima, both of Hino; Shigemi Inagaki, Musashino; Susumu Ito, Hino, all of Japan

[73] Assignee: Fujitsu Fanuc Limited, Tokyo, Japan

[21] Appl. No.: 304,267

[22] Filed: Sep. 21, 1981

[30] Foreign Application Priority Data

Sep. 30, 1980 [JP] Japan .................. 55-135259

[51] Int. Cl.³ .............................................. B25J 9/00
[52] U.S. Cl. .................... 414/735; 414/744 R; 901/17; 901/21; 901/23; 901/29
[58] Field of Search ............... 414/744 A, 744 R, 730, 414/4, 5, 744 B, 744 C, 751-753, 732, 735, 737, 738; 901/17

[56] References Cited

U.S. PATENT DOCUMENTS

| Re. 28,437 | 6/1975 | Devol et al. | 414/730 X |
| 3,543,910 | 12/1970 | Devol et al. | 414/730 X |
| 3,784,031 | 1/1974 | Niitu | 414/735 |
| 3,826,383 | 7/1974 | Richter | 414/730 |
| 3,834,555 | 9/1974 | Bennington et al. | 414/744 B X |
| 4,274,802 | 6/1981 | Inaba et al. | 414/730 X |

FOREIGN PATENT DOCUMENTS

| 0048905 | 4/1982 | European Pat. Off. |  |
| 0048904 | 4/1982 | European Pat. Off. |  |
| 2158558 | 6/1973 | France | 414/4 |
| 1441999 | 7/1976 | United Kingdom | 414/4 |

Primary Examiner—Leslie J. Paperner
Assistant Examiner—Terrance L. Siemens
Attorney, Agent, or Firm—Armstrong, Nikaido, Marmelstein & Kubovcik

[57] ABSTRACT

An industrial robot having a trunk mounted for vertical and rotational movement on a stationary base is provided with two arm members extensible from the said trunk having a robot wrist mechanism attached to their ends. The extending and contracting movements of the arm members, rotational movement of the wrist and swinging movement of the wrist are controlled, respectively, by three electric servo motors mounted in a mounting compartment positioned on the side of the trunk opposite to the extensible arms.

2 Claims, 2 Drawing Figures

INDUSTRIAL ROBOT

The present invention relates to an industrial robot operating as an industrial manipulating device, and in particular to an industrial robot with an improved arrangement of means for actuating controlled manipulating motions of the robot.

BACKGROUND OF THE INVENTION

An industrial robot having a robot hand for carrying an object, such as a workpiece, is conventionally used for transferring the object, or for attaching an unmachined workpiece to an automatic machine tool and detaching a machined workpiece from the machine tool. In the conventional industrial robot, the rotating motion and the vertical linear movement of a robot body with respect to a stationary robot base as well as the telescopically extending and contracting motions of a robot arm with respect to the robot body are actuated by drive means comprised of electric motors, such as known electric servo motors, so that the robot hand attached to the free end of the robot arm by means of a robot wrist is brought toward and positioned at a desired position. However, since the robot wrist of the conventional industrial robot is generally so constructed that the rotating motion of the wrist about the central axis thereof as well as the swinging motion of the wrist about an axis perpendicular to the central axis is actuated by hydraulic or pneumatic actuating means, only fixed amounts of rotating and swinging motions of the wrist are permitted. That is, it is difficult to provide the robot wrist with a free unfixed desired amount of rotating and swinging motions. On the other hand, if an electric motor or motors were adopted for actuating the motions of the robot wrist, it would be possible to control the rotating and swinging motions of the robot wrist. However, provision of a mechanical convertor or convertors would always be required for the purpose of acquiring low speed rotating and swinging motions of the robot wrist from the high speed rotation of the electric motor or motors. Therefore, such mechanical convertor would have to be sufficiently small in size and simple in mechanism for enabling the robot wrist to move into a small space within a machine cooperating with the industrial robot thereby exhibiting a required performance of the industrial robot.

SUMMARY OF THE INVENTION

An object of the present invention is therefore to provide an industrial robot provided with an improved arrangement of means for actuating diverse kinds of controlled motions of the robot, whereby the above-mentioned requirements can fully be met.

In accordance with the present invention, there is provided an industrial robot comprising:
a lowermost stationary base;
a robot trunk means rotatably and vertically movably mounted on said stationary base, said robot trunk having laterally spaced apart front and rear sides thereof;
a first actuating means having two electric motors, one for actuating a rotating motion of said robot trunk means and the other for actuating a vertical linear movement of said robot trunk;
a robot arm means supported by said robot trunk and being capable of extending from and contracting into said front side of said robot trunk means;
a second actuating means having an electric motor for actuating extending and contracting motions of said robot arm means;
a robot wrist means attached to an outermost free end of said robot arm means, said robot wrist being rotatable about a first axis and swingable about a second axis perpendicular to said first axis, and;
a third actuating means having two electric motors, one for actuating a rotating motion of said robot wrist about said first axis and the other for actuating a swinging motion of said robot wrist about said second axis, said two electric motors of said third actuating means being arranged in a mounting compartment of said robot trunk which compartment is provided at said rear side of said robot trunk.

The other objects, features and advantages of the present invention will become apparent from the ensuing description of a preferred embodiment with reference to the accompanying drawings wherein:

DETAILED DESCRIPTION OF THE INVENTION

Figure 1:
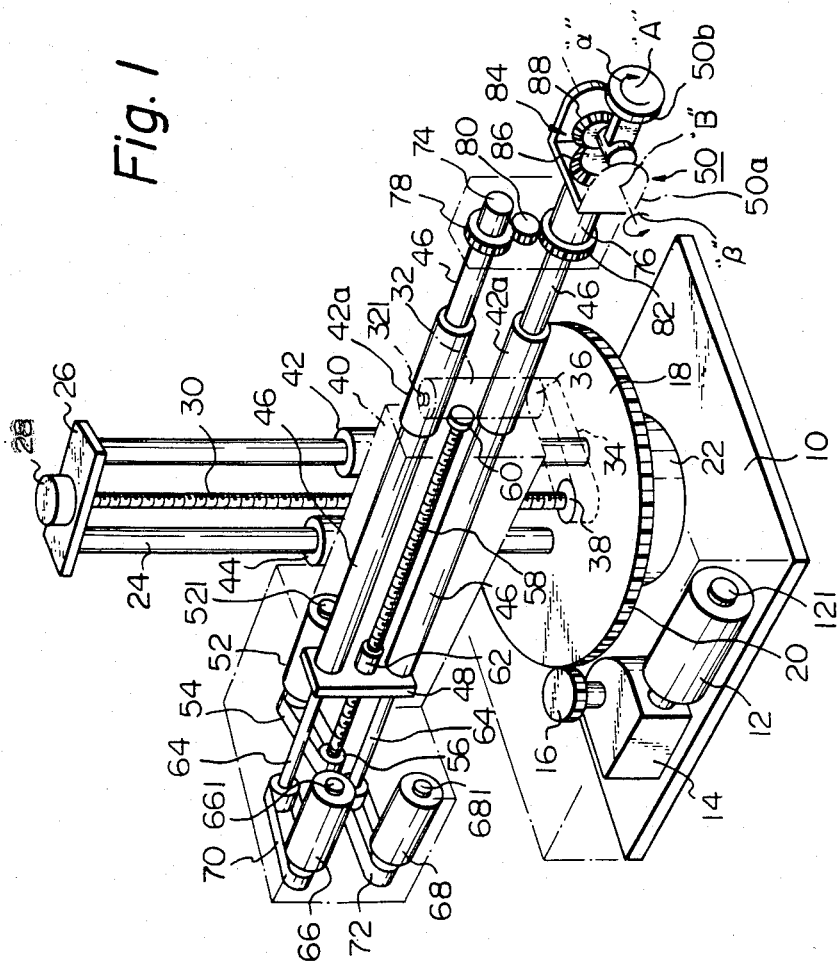
FIG. 1 is a schematic perspective view of an industrial robot, according to the present invention.

Referring to FIG. 1, the industrial robot is provided, at its lowermost part, with a base 10 to be fixed to a floor surface. On the upper surface of the base 10, there is mounted an electric motor 12, such as, for example, an electric servo motor and a reduction gear 14 connected to the output shaft of the electric motor 12. The reduction gear 14 has a vertically arranged output shaft on which a pinion 16 is mounted so as to be rotatable in a horizontal plane. On the base 10, there is also mounted a rotatable base member 18 by means of a bearing device 22 so that the rotatable base member 18 is able to be rotated in a horizontal plane. The rotatable base member 18 has a circular periphery formed with teeth meshed with the above-mentioned pinion 16. Therefore, the rotatable base member 18 is rotated by receiving a rotary drive force from the pinion 16. On the rotatable base member 18, a pair of vertical guide rods 24 are fixedly mounted, and the upper ends of both guide rods 24 are connected together by an upper plate 26 on which a later described braking device 28 is mounted. A vertical ball screw shaft 30 is provided between the rotatable base member 18 and the upper plate 26 so that the screw shaft 30 is parallel with the above-mentioned guide rods 24. To the lowermost end of the ball screw shaft 30 is attached a pulley 38 which receives a rotary drive force from an electric motor 32 via a belt 34 and a pulley 36 attached to the output shaft of the electric motor 32. It should here be understood that the electric motor 32 is comprised of an electric servo motor similar to the afore-mentioned motor 12. The electric motor 32 is attached to the rotatable base member 18 by means of appropriate attachments and bracket means. The ball screw shaft 30 is engaged with a female screw member (not shown in FIG. 1) mounted in a box-like robot trunk 40 which is vertically slidable along the vertical guide rods 24 by means of slide sleeves 42 and 44. That is, in response to the normal and reverse rotation of the ball screw shaft 30, the robot trunk 40 slides upwardly or downwardly along the guide rods 24. The sliding movement of the robot trunk 40 can be rapidly stopped by applying a braking force to the ball screw shaft 30 from the braking device 28. The robot trunk 40 is provided with a pair of robot arms 46 arranged parallel with one another. The two robot arms 46 are able to extend outwardly from the robot trunk 40 as well as to contract inwardly into the robot trunk 40 along a horizontal axis perpendicular to the vertical axis of the ball screw shaft 30. A pair of slide sleeves 42a are provided for the robot trunk 40 for the purpose of enabling a smooth sliding movement of the two robot arms 46. The above-mentioned robot arms 60 extend through the robot trunk 40 and have a common end plate 48 attached to the rear ends of the two robot arms 46. The robot arms 46 also have a robot wrist 50, which will be described later, attached to the front ends of the two robot arms 46. The extending and contracting motions of the pair of robot arms 46 is actuated by an electric motor 52 arranged in a mounting compartment of the robot trunk 40, which compartment is provided at a side opposite to the side on which the robot wrist 50 attached to the free ends of the pair of robot arms 46 is arranged. The electric motor 52 is comprised of a well known electric servo motor exerting, on its output shaft, a normal and a reverse rotating force. To the output shaft of the electric motor 52, is attached a drive pulley (not shown in FIG. 1) which is connected to a driven pulley 56 via a belt 54. The driven pulley 56 is attached to the rear end of a horizontal ball screw shaft 58 which is arranged in the robot trunk 40 parallel with the pair of robot arms 46. The front end of the horizontal ball screw shaft 58 is rotatably supported by bearing means 60, so that the ball screw shaft 58 is rotated by the electric motor 52 in both normal and reverse direction. Since the ball screw shaft 58 is threadedly engaged with a female screw member 62 fixed to the end plate 48 of the two robot arms 46, the robot arms 46 perform the extending and contracting motions under the guidance of the slide sleeves 42a when the ball screw shaft 58 is rotated in the normal and reverse directions. Two ball spline shafts 64 are respectively fitted in the above-mentioned robot arms 46 via ball spline nuts 63 (FIG. 2) which are rotatably mounted on the rear end of the robot arms 46. The respective one ends of the ball spline shafts 64 extend into the robot arms 46, and the respective other ends of the ball spline shafts 64 extend into the rear compartment of the robot trunk 40. One of the spline shafts 64 is arranged so as to be rotated by an electric motor 66 by means of a belt-pulley mechanism 70, while the other spline shaft 64 is arranged so as to be rotated by an electric motor 68 by means of a belt-pulley mechanism 72. The electric motors 66 and 68 are comprised of electric servo motors, respectively, so that the rotating amounts of respective spline shafts 64 in the normal and reverse directions are controlled by the respective servo motors. Further, the belt-pulley mechanisms 70, 72 should preferably be comprised of the combination of a well known timing belt and a toothed pulley, respectively, so that the precise transmission of a rotating force is achieved. At this stage, it should be understood that the two spline shafts 64 can be rotated individually by respective electric motors 66 and 68. The rotating motions of the two spline shafts 64 which are caused either independently of or in synchronism with the extending and contracting motions of the two robot arms 46, are used for causing the two rotating motions of the robot wrist 50 about the two mutually perpendicular axes. The upper spline shaft 64 illustrated in FIG. 1 is eventually connected to a reduction gear 74 which is comprised of a known harmonic drive (Trade Mark), and the lower spline shaft 64 is eventually connected to a similar reduction gear 76. However, the rotation of the reduction gear 74 is transmitted to a spur gear 82 fixed to the outer periphery of the recution gear 76 through a spur gear 78 fixed to the outer periphery of the said reduction gear 74 and an intermediate spur gear 80. Thus, the rotating motion of the reduction gear 74 which is eventually transmitted to the reduction gear 76, via the spur gear 78, the intermediate gear 80 and the spur gear 82 cause the rotating motion of a wrist housing 50a about the axis shown by "A" in the normal and reverse directions designated by a character "α". As a result, a wrist flange 50b, which is connectable to a robot hand (not shown in FIGS. 1 and 2) and is supported by the wrist housing 50a, is also rotated about the axis "A" in the directions designated by "α". On the other hand, when the reduction gear 76 is rotated by the lower spline shaft 64, the output shaft of the said reduction gear 76 rotates a drive bevel gear 86 of a bevel gear mechanism 84 housed in the wrist housing 50. The rotating motion of the drive bevel gear 86 causes the rotating motion of a driven bevel gear 88 engaged with the drive bevel gear 86. As a result, the wrist flange 50b fixed to a shaft of the driven bevel gear 88 is rotated about an axis "B" in the normal and reverse directions designated by a character "β". At this stage, it should be understood that both the rotating and swinging motions "α" and "β" of the robot wrist 50 are actuated by the electric servo motors 66 and 88 through the operation of the reduction gears 74 and 76. Therefore, the directions and the amounts of both rotating and swinging motions of the wrist flange 50b of the robot wrist 50 can easily be controlled by electric servo motors 66 and 88. The two ball spline shafts 64 may be respectively provided with braking means (not illustrated in FIG. 1) which can rapidly stop the rotations of the ball spline shafts 64. Provision of such braking means can ensure the stoppage of the rotation of any one or both of the two ball spline shafts 64 when any unexpected accident, such as for example, the cutting of either one or both of the belts 70 and 72 has occurred. As a result, the safe operation of the industrial robot is guaranteed. It should here be understood that the braking device 28 provided for the vertical movement mechanism of the robot trunk 40 can also contribute to the safe operation of the industrial robot.

Figure 2:
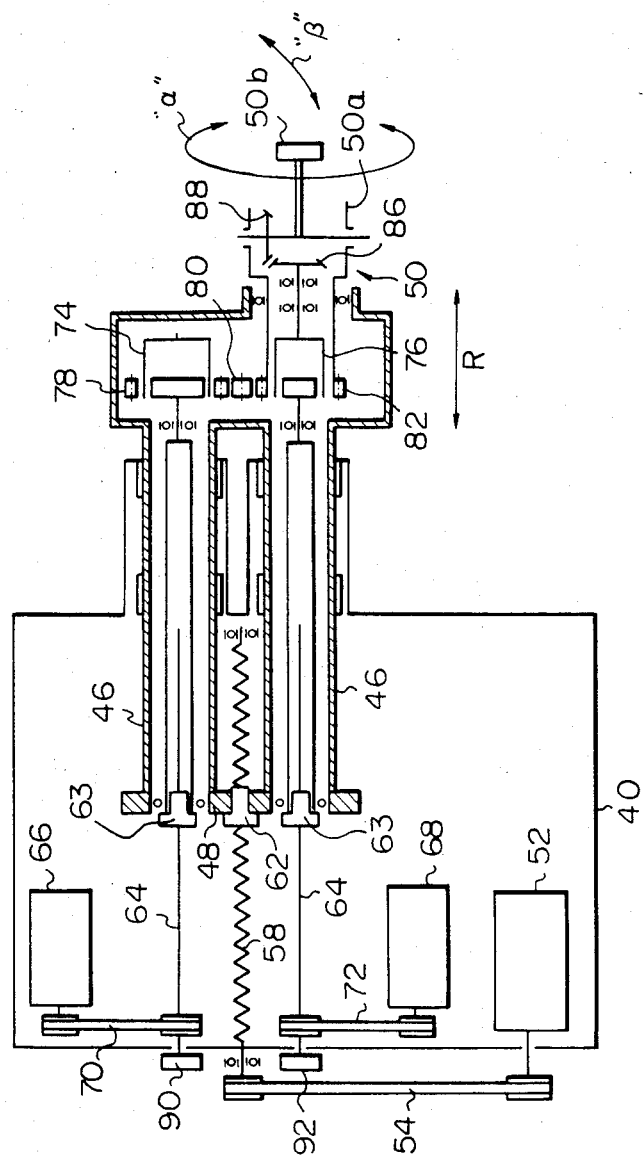
FIG. 2 is a schematic cross-sectional view illustrating the mechanism of a robot arm and a robot wrist of the industrial robot of FIG. 1.

FIG. 2 schematically illustrates the mechanism of the pair of robot arms 46 mounted in the robot trunk 40 and the robot wrist 50 attached to the free end of the pair of robot arms 46. Specifically, FIG. 2 illustrates how the extending and contracting motions of the robot arms are actuated by the electric motor 52 and the ball screw mechanism comprised of the ball screw shaft 58 and the ball nut 62, and also how the rotating and swinging motions of the robot wrist 50 are actuated by the electric motors 66 and 68 and the reduction gears 74 and 76. In FIG. 2, the above-mentioned braking means for rapidly braking the rotation of the two ball spline shafts 64 are designated by reference numerals 90 and 92.

In the embodiment of the present invention, as illustrated in FIGS. 1 and 2, all electric motors 12, 32, 52, 66 and 68 should preferably be direct-current servo motors provided with known pulse coders 121, 321, 521, 661 and 681 for detection of the rate and the position of the motors, respectively. Further, the method of controlling the above-mentioned direct-current servo motors should preferably be achieved by the employment of a servo mechanism disclosed in the Japanese Laid-open application for patent No. 54(1979)-106776, which mechanism includes a position control unit and a velocity control unit.

From the foregoing description of the embodiment of the present invention, it will be understood that in an industrial robot according to the present invention, not only the rotating and vertically linear motions of the robot trunk and the extending and contracting motions of the robot arm but also the rotating and swinging motions of the robot wrist are all actuated by respective electric motors. Therefore, the two degrees of motions of the robot wrist can be controlled by the employment of the electric servo control method. Accordingly, in comparison with the employment of a hydraulic or pneumatic servo control method in which many fluid supply conduits and fluid control valves must be arranged for providing the robot wrist with a considerable number of free controlled motions, the entire arrangement of means for actuating the controlled motions of the robot wrist can be very simple. In addition, since the electric motors for actuating the rotating and swinging motions of the robot wrist are arranged in the mounting space provided on the rear end side of the robot arms, the electric motors can act as a weight means balancing with the weight of an object gripped by a robot hand attached to the front free ends of the pair of robot arms during the manipulating operations of the industrial robot. Accordingly, the operation of the industrial robot can be very steady. Further, since the harmonic drives are employed as mechanical convertors, the entire size of the robot wrist can be small in comparison with the employment of mechanical convertors comprised of gear trains. Therefore, the robot wrist can move into a small space of a machine cooperating with the industrial robot for exhibiting the necessary function of the industrial robot.

We claim:

1. An industrial robot comprising a trunk means mounted for vertical and rotational movement on a stationary base;
   a pair of slide sleeves fixed on said trunk means;
   first and second arm members mounted within said slide sleeves for rotational and translational movement therein, the outer ends of said arm members being extensible from and retractable into a side of said trunk means through said slide sleeves;
   a robot wrist mechanism attached to said outer ends of said arm members, said robot wrist being rotatable about a first axis and swingable about a second axis perpendicular to said first axis;
   a mounting compartment positioned on said trunk means at a side opposite to the side from which said arm means extend;
   first and second electric motor means fixedly mounted on said trunk means within said mounting compartment;
   first and second ball spline shafts driven, respectively, by said first and second electric motor means and connected, respectively, with said first and second arm members for imparting rotational movement thereto;
   mechanical reduction means comprising a pair of harmonic drives connected between said first and second arm members and said robot wrist mechanism for converting said rotational movement of said first and second arm members into rotational and swinging motion of said robot wrist mechanism at predetermined reduction ratios, respectively; and
   third electric motor means fixedly mounted on said trunk means within said mounting compartment, said third electric motor means being connected through ball screw shaft means to both of said arm members for imparting reversible translatory motion thereto.

2. An industrial robot as set forth in claim 1 wherein said electric motor means are comprised of electric servo motors, respectively.

* * * * *